(12) United States Patent
Hartwig et al.

(10) Patent No.: US 8,766,477 B2
(45) Date of Patent: Jul. 1, 2014

(54) DRIVE SYSTEM FOR A FACILITY HAVING AN ALTERNATING-CURRENT ISOLATED NETWORK

(75) Inventors: Bernd Hartwig, Erlangen (DE); Reinhard Vogel, Herzogenaurach (DE)

(73) Assignee: Siemens Aktiengesellschaft, Munich (DE)

( * ) Notice: Subject to any disclaimer, the term of this patent is extended or adjusted under 35 U.S.C. 154(b) by 282 days.

(21) Appl. No.: 13/263,906

(22) PCT Filed: Apr. 7, 2010

(86) PCT No.: PCT/EP2010/054568
§ 371 (c)(1),
(2), (4) Date: Oct. 11, 2011

(87) PCT Pub. No.: WO2010/118975
PCT Pub. Date: Oct. 21, 2010

(65) Prior Publication Data
US 2012/0043817 A1    Feb. 23, 2012

(30) Foreign Application Priority Data

Apr. 14, 2009  (DE) .................. 10 2009 017 023

(51) Int. Cl.
*H02J 3/34* (2006.01)
*B60L 9/28* (2006.01)
*B60L 7/06* (2006.01)
*B63H 23/24* (2006.01)
*H02P 23/06* (2006.01)
*H02P 3/22* (2006.01)
*H02M 5/451* (2006.01)
*H02M 5/45* (2006.01)

(52) U.S. Cl.
CPC . *H02P 23/06* (2013.01); *B60L 9/28* (2013.01); *B60L 7/06* (2013.01); *H02P 2201/13* (2013.01); *B63H 23/24* (2013.01); *H02P 3/22* (2013.01); *H02M 5/451* (2013.01); *H02M 5/4505* (2013.01)
USPC ............................................. 307/73

(58) Field of Classification Search
USPC ........................................................ 307/73
See application file for complete search history.

(56) References Cited

U.S. PATENT DOCUMENTS

| | | | | |
|---|---|---|---|---|
| 3,786,337 | A * | 1/1974 | Kugler | 323/343 |
| 4,039,914 | A | 8/1977 | Steigerwald et al. | |
| 4,428,023 | A * | 1/1984 | Maier | 361/100 |
| 5,023,516 | A * | 6/1991 | Ito et al. | 315/101 |
| 5,115,389 | A * | 5/1992 | Ouchi et al. | 363/125 |
| 5,757,599 | A * | 5/1998 | Crane | 361/56 |
| 5,793,622 | A * | 8/1998 | Dahler et al. | 363/34 |
| 6,222,334 | B1 | 4/2001 | Tamagawa et al. | |
| 6,592,412 | B1 | 7/2003 | Geil et al. | |
| 6,893,304 | B1 | 5/2005 | Andersen et al. | |
| 7,081,725 | B2 * | 7/2006 | Seely et al. | 318/139 |
| 7,593,244 | B2 * | 9/2009 | Sodo et al. | 363/47 |
| 7,742,321 | B2 * | 6/2010 | Komulainen et al. | 363/37 |
| 8,508,961 | B2 * | 8/2013 | Yamanaka | 363/40 |
| 8,514,601 | B2 * | 8/2013 | Alexander | 363/132 |
| 2007/0279958 | A1 * | 12/2007 | Komulainen et al. | 363/132 |
| 2008/0259658 | A1 * | 10/2008 | Sodo et al. | 363/37 |
| 2011/0149624 | A1 * | 6/2011 | Yamanaka | 363/131 |

FOREIGN PATENT DOCUMENTS

| | | |
|---|---|---|
| DE | 749817 C | 1/1945 |
| DE | 870725 C | 3/1953 |
| DE | 1513532 A1 | 12/1969 |
| DE | 2237233 A1 | 2/1974 |
| DE | 2237233 * | 7/1976 |
| DE | 3304207 A1 | 9/1983 |
| DE | 3409631 A1 | 9/1985 |
| DE | 19944244 A1 | 3/2000 |
| DE | 10011601 A1 | 2/2001 |
| EP | 2062813 A1 | 5/2009 |
| JP | S4945323 | 4/1974 |
| JP | 6090593 A | 3/1994 |
| JP | 2003-517394 | 5/2003 |
| JP | 2005006476 A | 1/2005 |

OTHER PUBLICATIONS

Australian Office Action dated Mar. 21, 2013.
International Search Report for International Application No. PCT/EP2010/054568 dated Apr. 7, 2010.
German Office Action for German Patent Application No. 10 2009 017 023.5 dated Mar. 26, 2010.
Office Action for corresponding Japanese patent application No. 2012-505126 dated Sep. 17, 2013.

\* cited by examiner

*Primary Examiner* — Rexford Barnie
*Assistant Examiner* — Daniel Kessie
(74) *Attorney, Agent, or Firm* — Harness, Dickey & Pierce, P.L.C.

(57) ABSTRACT

At least one embodiment of the invention generally relates to a drive system for a facility having an alternating-current isolated network, in particular for a ship or an offshore platform, including a three-phase drive machine, which can be operated both as a motor and as a generator, and including a converter having a direct-current intermediate circuit having an intermediate circuit voltage. At least one embodiment of the invention aims to provide a way of avoiding undesired and/or impermissible voltage and/or frequency increases in the alternating-current isolated network. For this purpose, the drive system includes according to the invention an energy absorbing device arranged in the intermediate circuit, which energy absorbing device includes at least one energy absorber, which preferably includes at least one electrical resistor, for absorbing at least a part of the electrical energy that the three-phase drive machine generates in generator operation and outputs to the intermediate circuit by way of the motor-side current converter of the converter. The energy absorber can be activated by the energy absorbing device according to the polarity of the intermediate circuit voltage. The energy absorbing device is preferably variable regarding an absorption of electrical braking power of the three-phase drive machine.

23 Claims, 6 Drawing Sheets

DRIVE SYSTEM FOR A FACILITY HAVING AN ALTERNATING-CURRENT ISOLATED NETWORK

PRIORITY STATEMENT

This application is the national phase under 35 U.S.C. §371 of PCT International Application No. PCT/EP2010/054568 which has an International filing date of Apr. 7, 2010, which designated the United States of America, and which claims priority on German patent application number DE 10 2009 017 023.5 filed Apr. 14, 2009, the entire contents of each of which are hereby incorporated herein by reference.

FIELD

At least one embodiment of the invention generally relates to a drive system for a facility having an alternating-current isolated network, in particular for a ship or an offshore platform.

BACKGROUND

The converter having a direct-current intermediate circuit (also referred to as a "Load Commutated Inverter" (LCI)) is a comparatively simple, widely used converter circuit for drive systems. A converter of this type comprises a network-side current converter and a machine-side current converter, the network-side current converter being connected on the input side to an alternating-current network and on the output side to a direct-current intermediate circuit, and the motor-side current converter being connected on the input side to the direct-current intermediate circuit and on the output side to a three-phase drive machine. A choke which serves as an energy store for the intermediate circuit current is usually inserted in the direct-current intermediate circuit, so that, as far as possible, an ideally smoothed, constant intermediate circuit current flows.

A converter of this type is used very frequently for drives with high-power synchronous machines and offers a comparatively simple possibility of IV quadrant operation (i.e. motor and generator operation) of the three-phase drive machine in both directions of rotation.

In motor operation (i.e. when "driving"), the three-phase drive machine draws electrical energy from the alternating current network via the converter. In this case the network-side current converter works in rectifier operation and the machine-side current converter works in inverter operation.

In generator operation (i.e. when "braking"), the three-phase drive machine generates electrical energy and outputs it via the converter to the alternating-current network. In this case the network-side current converter works in inverter operation and the machine-side current converter works in rectifier operation.

The converter having a direct-current intermediate circuit, especially in combination with synchronous machines, is very frequently used for electric ship drives (main propulsion drives). This applies above all to high drive powers in the single-digit or double-digit megawatt range.

In ship drives, especially when propellers with fixed blades ("fixed-pitch propellers") are used, generator operation in quadrants IV and II is indispensable in order to be able to brake the propeller and to reverse the direction of rotation thereof. The reason is that the moving ship constitutes a "drag-through load" as a result of water flow.

In ship drives having a converter with a direct-current intermediate circuit, the energy released during generator operation is normally fed back into the network via the converter. During a braking process of a ship, this energy can be in the double-digit or triple-digit megajoule range, the braking time being generally within the range from approximately 10 to 60 seconds.

For ships with an onboard network which has only a small so-called "hotel load", i.e. in which the main electric drive system represents by far the largest electrical consumer, energy recovery to the onboard network is often not desired and/or is not possible with the required power, since in these cases the energy recovery would produce undesired and/or impermissible voltage and/or frequency increases of the onboard voltage. These problems can occur in principle in alternating-current isolated networks, since the number of electrical consumers and therefore the absorption capacity of the network for recovered energy is often limited precisely in isolated networks.

In a solution described in the still unpublished European patent application of the applicant with the official reference number 07022773.1, undesired and/or impermissible voltage and/or frequency increases of the voltage of an alternating-current network of a ship are avoided by converting the recovered energy into heat in a braking resistor which is temporarily connected to the network. Through the braking resistor, therefore, an additional consumer is connected to the onboard network, but the actual energy feedback to the onboard network is not itself prevented. In this case, an abrupt change in the power balance occurs when switching the braking resistor both in and out, placing high demands on the dynamics of the generator control systems.

For drive systems having a converter with a direct voltage intermediate circuit instead of a direct current intermediate circuit, circuits having a braking resistor arranged in the direct voltage intermediate circuit are known. As a rule, such a solution is used when the network-side current converter is in the form of a rectifier with diodes, so that energy feedback to the alternating current network cannot take place. However, because of the essential functional differences between a direct voltage intermediate circuit and a direct current intermediate circuit, such solutions cannot be straightforwardly transferred to a converter having a direct current intermediate circuit.

A ship drive system in which a three-phase drive motor is connected directly to the network without an interposed converter is known from DE 749817. In this case, in generator operation the motor is isolated galvanically from the network and connected to braking resistors by means of a change-over switch.

A ship drive system in which a three-phase drive motor is connected directly to the network without an interposed converter is also known from DE 870 725 A. A motor having a plurality of three-phase and exciter winding systems without reciprocal influences is used. The three-phase winding system used for braking is inactive in motor operation; that is, in motor operation no voltages are induced therein. For braking, a voltage is induced in this three-phase winding system by supplying a suitable exciter current, so that, by means of braking resistors connected to the three-phase winding system concerned, a current which brakes the drive can flow.

Both solutions therefore describe different ways of braking three-phase ship drive motors which are operated directly from the alternating-current network. They cannot therefore be applied straightforwardly to three-phase drives with converter feed, especially those having a current intermediate circuit.

SUMMARY

At least one embodiment of the present invention provides, for a drive system, a way of avoiding undesired and/or impermissible voltage and/or frequency increases in the alternating-current isolated network.

At least one embodiment of the invention starts from the consideration that undesired and/or impermissible voltage and/or frequency increases of the onboard network voltage can be avoided if the feedback of energy to the alternating-current isolated network is itself already at least partially prevented. Although the current converters on the network side and on the machine side can be operated via their control and regulation systems in such a way that no energy is fed back into the network, the energy arising in generator operation (the braking energy arising through physical causation in the case of a ship when the propeller is braked) must be reduced in a different way.

According to at least one embodiment of the invention, therefore, the drive system has an energy absorbing device arranged in the intermediate circuit, which energy absorbing device comprises at least one energy absorber for absorbing at least a part of the electrical energy which the three-phase drive machine generates in generator operation and outputs to the intermediate circuit via the motor-side current converter. The energy absorber includes, in at least one embodiment, at least one ohmic resistor which converts the electrical energy into heat. However, it is also conceivable to temporarily store the electrical energy generated in generator operation in a suitable energy storage device, e.g. a high-power capacitor or a flywheel, and to supply it to a further application in the system. If the energy absorbing device comprises a plurality of energy absorbers, these may be connected to one another, for example in parallel and/or in series.

The recovered energy is therefore already partially absorbed in the intermediate circuit of the current converter, so that it cannot enter the network in the first place. In this case the recovered energy may be completely absorbed within the intermediate circuit, or only partially, depending on the energy absorption capacity of the consumers connected to the network, which capacity depends on the particular situation during generator operation.

According to at least one embodiment of the invention, the at least one energy absorber can be activated by the energy absorbing device at least as a function of the polarity of the intermediate circuit voltage. Such activation may consist, for example, in connecting the energy absorber to the intermediate circuit.

The underlying consideration here is that, in motor operation of the machine, the following equation must universally apply for the power $P_Z$ converted in the direct-current intermediate circuit:

$$P_{Z, motor} = U_Z \cdot I_Z > 0. \qquad \text{(Equation 1)}$$

In generator operation, therefore, the following must universally apply for the power $P_Z$ in the intermediate circuit:

$$P_{Z, generator} = U_Z \cdot I_Z < 0 \qquad \text{(Equation 2)}$$

The primary feature of a converter with a direct-current intermediate circuit is that the direction of flow of the current $I_Z$ of the intermediate circuit cannot in principle be reversed. Regardless of whether motor or generator operation is present, the sign of the current is therefore unchangeable (here "+1"); mathematically expressed, therefore, the following applies:

$$\text{Sign}\{I_{Z, motor}\} = \text{Sign}\{I_{Z, generator}\} = \text{const.} = +1 \qquad \text{(Equation 3)}$$

So that the power in the intermediate circuit can become negative, i.e. less than zero (see Equation 2), therefore, the polarity of the intermediate circuit voltage $U_Z$ must be reversed for generator operation:

$$\text{Motor operation: Sign}\{U_{Z, motor}\} = +1 \qquad \text{(Equation 4)}$$

$$\text{Generator operation: Sign}\{U_{Z, generator}\} = -1 \qquad \text{(Equation 5)}$$

The polarity of the intermediate circuit voltage is therefore an indicator of the operating mode of the three-phase drive machine and can be utilized in a specified manner to activate the energy absorber in generator operation and to deactivate it in motor operation.

Activation of the energy absorber with a polarity of the intermediate circuit voltage present in generator operation can be effected especially simply since the energy absorbing device includes a diode which is connected in series with the energy absorber and is polarized in such a way that it is conductive with a polarity of the intermediate circuit voltage present during generator operation and blocks with a polarity of the intermediate circuit voltage present during motor operation. In this case, with a plurality of energy absorbers connected in series, a single diode which is connected in series with this series circuit, and is therefore common to all the energy absorbers, is sufficient. With a plurality of energy absorbers connected in parallel, a common diode connected in series with this whole parallel circuit may be sufficient; however, a respective diode may also be present for each of the energy absorbers.

Alternatively, the energy absorbing device may comprise, instead of the diode, a controllable power electronic semiconductor switch which is connected in series with the energy absorber and is polarized in such a way that, with a polarity of the intermediate circuit voltage present in generator operation, it can be switched to a conductive state and, with a polarity of the intermediate circuit voltage present in motor operation, it blocks. The energy absorber can therefore be connected to the intermediate circuit in a specified manner, whereby the timing and therefore the proportion of the recovered energy which is absorbed in the intermediate circuit or is supplied to the network can be actively controlled. For this purpose, the power electronic semiconductor switch is preferably in the form of a reverse-blocking power semiconductor component, in particular a thyristor. In this case, with a plurality of energy absorbers connected in series, a single semiconductor switch connected in series with this series circuit, and therefore common to all the energy absorbers, is likewise sufficient. With a plurality of energy absorbers connected in parallel, a common semiconductor switch connected in series with this parallel circuit may be sufficient; however, a respective semiconductor switch which is connected in series with the energy absorber may also be present for each of the energy absorbers.

According to an especially advantageous embodiment, the energy absorbing device is configured to be variable with regard to an absorption of electrical braking power of the three-phase drive machine. The absorption of electrical braking power can then be adjusted as a function of the amount of a necessary, situation-dependent braking torque of the three-phase drive machine.

In order to vary the absorption of electrical braking power, the energy absorbing device may comprise, for at least some of the energy absorbers, a respective switch connected in series or in parallel with the respective energy absorber. The energy absorbers, preferably a plurality of ohmic resistors, can thereby be switched in and/or out and the energy and power absorption, and therefore the braking torque, of the three-phase drive machine can therefore be varied in steps during generator operation of the three-phase drive machine. The energy absorbing device may comprise, for example, a plurality of energy absorbers connected in parallel, each having a respective switch connected in series therewith, or a plurality of energy absorbers connected in series, each having a respective switch connected in parallel therewith.

The switch or switches are preferably in the form of power electronic semiconductor switches. In this case semiconductor switches which can or which cannot be switched off may be used. In the case when the semiconductor switch cannot absorb a cut-off voltage, a diode which can absorb this cut-off voltage is preferably connected in series therewith.

If the power electronic semiconductor switch is in the form of a reverse-blocking power semiconductor component, in particular a thyristor, a diode connected in series with the at least one energy absorber can be omitted, since the reverse-blocking power semiconductor component can also take over the function of the diode.

Alternatively or additionally, at least one of the energy absorbers may be in the form of a continuously variable ohmic resistor, in order to vary the absorption of electrical braking power of the three-phase drive machine. The absorption of electrical braking power of the three-phase drive machine, and therefore its braking torque, can thereby be varied steplessly.

According to an especially advantageous embodiment, the drive system includes a monitoring and control device for controlling and/or regulating the absorption of electrical braking power of the three-phase drive machine by the energy absorbing device as a function of a desired reference braking torque of the three-phase drive machine and as a function of actual values of the drive system. These actual values may be, for example, values for the polarity of the intermediate circuit voltage and/or
the level of the intermediate circuit voltage and/or
the intermediate circuit current and/or
the motor speed and/or
the motor voltage and/or
the motor current.

At least one embodiment of the invention can be used especially advantageously if the three-phase drive machine has a power in the single-digit or multi-digit megawatt range.

The energy absorbed by the energy absorbing device may also be utilized elsewhere, for example for heating cabin air and heating and service water. Additionally or alternatively, it may further prove to be especially advantageous, in particular in the case of drives in the high power range, if this energy can be stored. This may be effected, for example, in electrical energy stores (e.g. capacitors), in electrochemical energy stores (e.g. accumulators), in mechanical energy stores (flywheel storage devices) or in thermal stores (e.g. hot water storage devices). The at least one energy absorber may therefore be in the form of an energy store instead of an ohmic resistor, in particular a high power capacitor battery or an electrochemical battery (accumulator), or a flywheel storage device.

BRIEF DESCRIPTION OF THE DRAWINGS

The invention, and further advantageous embodiments of the invention according to features of the dependent claims, are explained in more detail below with reference to example embodiments and to the figures, in which:

DETAILED DESCRIPTION OF THE EXAMPLE EMBODIMENTS

Figure 1:
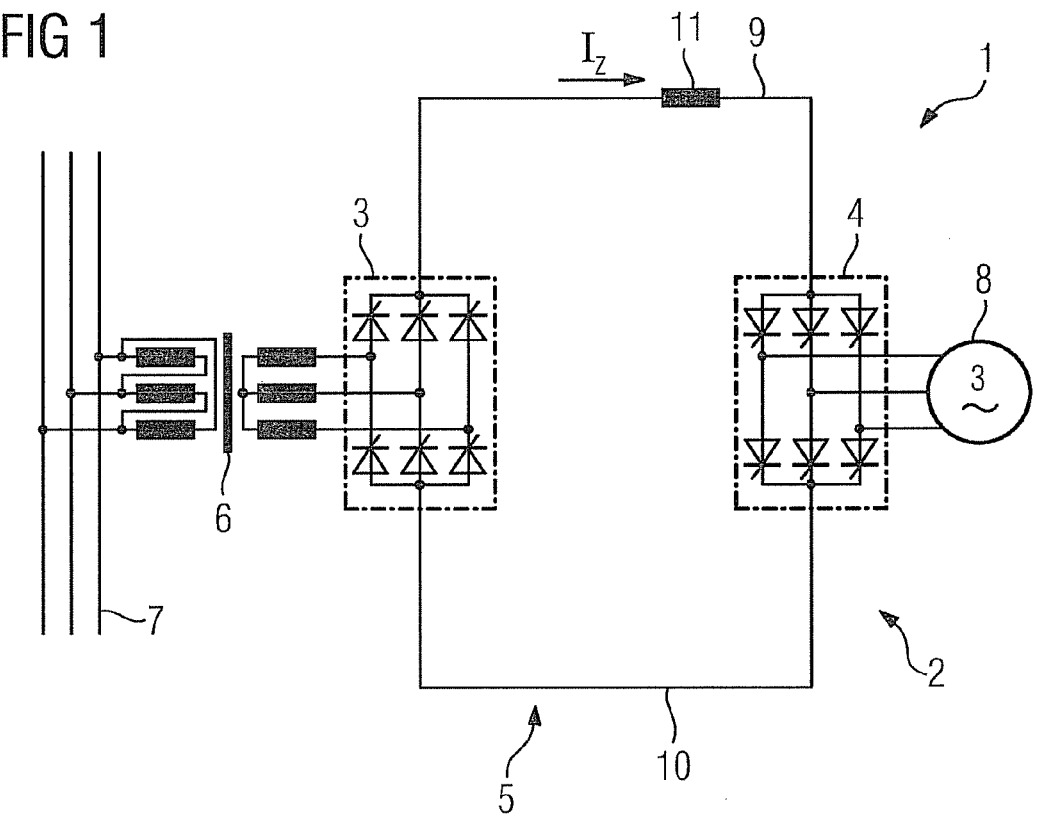
FIG. 1 shows a first drive system known from the prior art.

A drive system 1 for a ship shown in FIG. 1 and known from the prior art comprises a direct-current intermediate circuit converter 2, which in turn comprises a network-side current converter 3 and a machine-side current converter 4. The network-side current converter 3 is connected on the input side via a transformer 6 to an alternating-current network 7 and on the output side to the direct-current intermediate circuit 5. The motor-side current converter 4 is connected on the input side to the direct-current intermediate circuit 5 and on the output side to a three-phase drive machine 8. The current converters 3 and 4 each comprise a number of current converter valves in the form of power electronic semiconductor switches.

The direct current intermediate circuit 5 comprises two conductors 9, 10, a direct-current smoothing choke 11, which serves as an energy store for the intermediate circuit current $I_Z$, being connected in the conductor 9, so that in the ideal case (infinitely high inductance of the choke 11) an ideally smoothed, constant intermediate circuit current $I_Z$ flows. In this case the flow direction of the intermediate circuit current $I_Z$ cannot in principle be reversed, since it is permanently predetermined by the semiconductor switches, usually thyristors, in the network-side and machine-side current converters 3 and 4.

Figure 2:
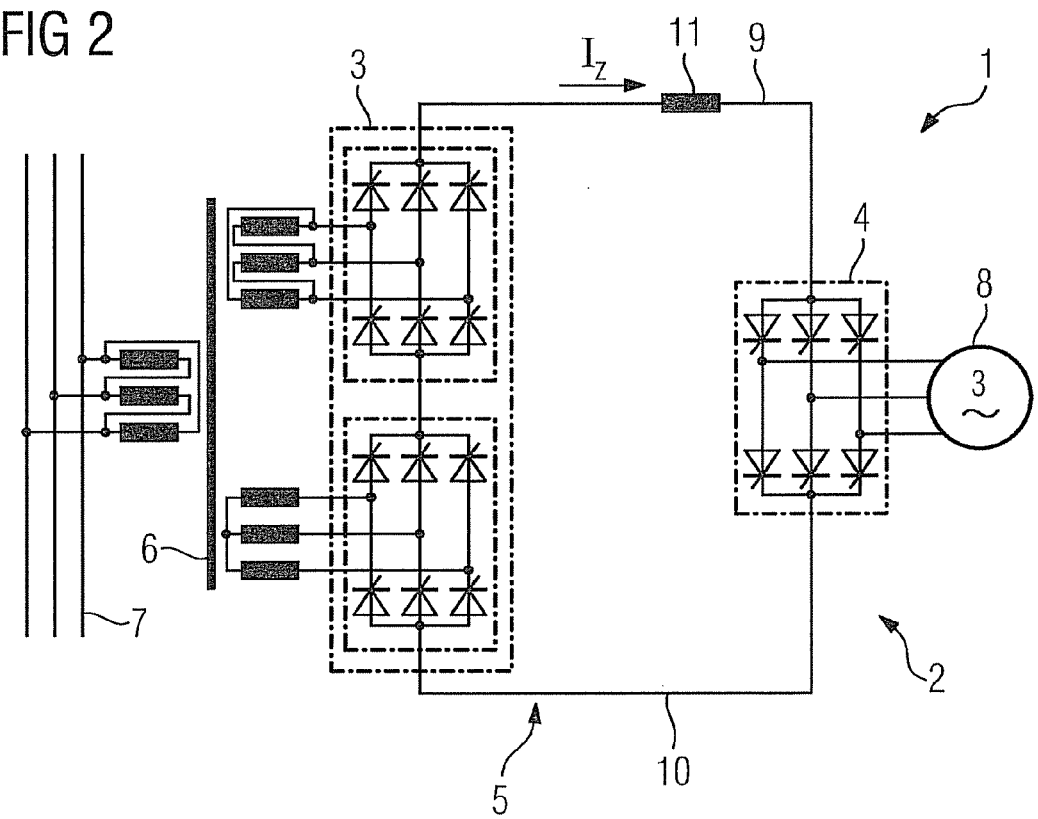
FIG. 2 shows a second drive system known from the prior art.

As shown in FIG. 2, the network-side current converter 3 often has a 12-pulse (or even higher-pulse) configuration for relatively high powers, in order to receive small harmonic network reactions. The machine-side current converter 4 usually has only a 6-pulse configuration. For very high powers, and/or in the event of redundancy demands, the feed of machines having a plurality of three-phase winding systems (not shown) can additionally be effected by the use of a plurality of converters.

The regulation and activation of the two current converters 3, 4 is usually effected by means of a control and regulation system located close to the current converter, as a function of the predefined motor reference torque. The reference torque is predetermined as a rule by a superposed speed control system. The required control and regulation components are not shown in the figures.

The rotating field machine is, for example, a synchronous machine with a power in the single-digit or double-digit megawatt range which is used as the main propulsion unit of a ship.

Figure 3:
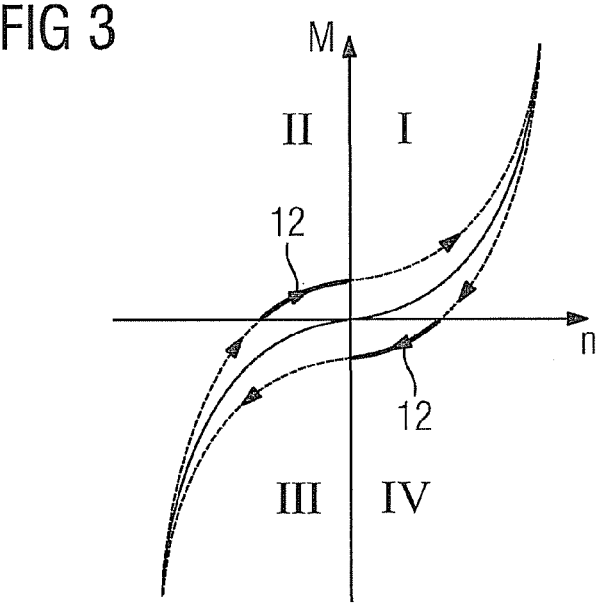
FIG. 3 is a speed/torque diagram for the four speed/torque quadrants of a ship drive in simplified form.

For the application explained above as a ship propulsion unit, the four quadrants of the speed/torque diagram can be represented in greatly simplified form as in FIG. 3 (simplified representation of the so-called "Robinson curves"). In particular if propellers with fixed blades (fixed-pitch propellers) are used, generator operation in quadrants IV and II is indispensable in order to be able to brake the propeller and to reverse the direction of rotation of the propeller. The reason is that the moving ship represents a "drag-through load" as a result of flowing water. The corresponding curve sections are represented in FIG. 3 by continuous lines and with reference number 12.

Figure 4:
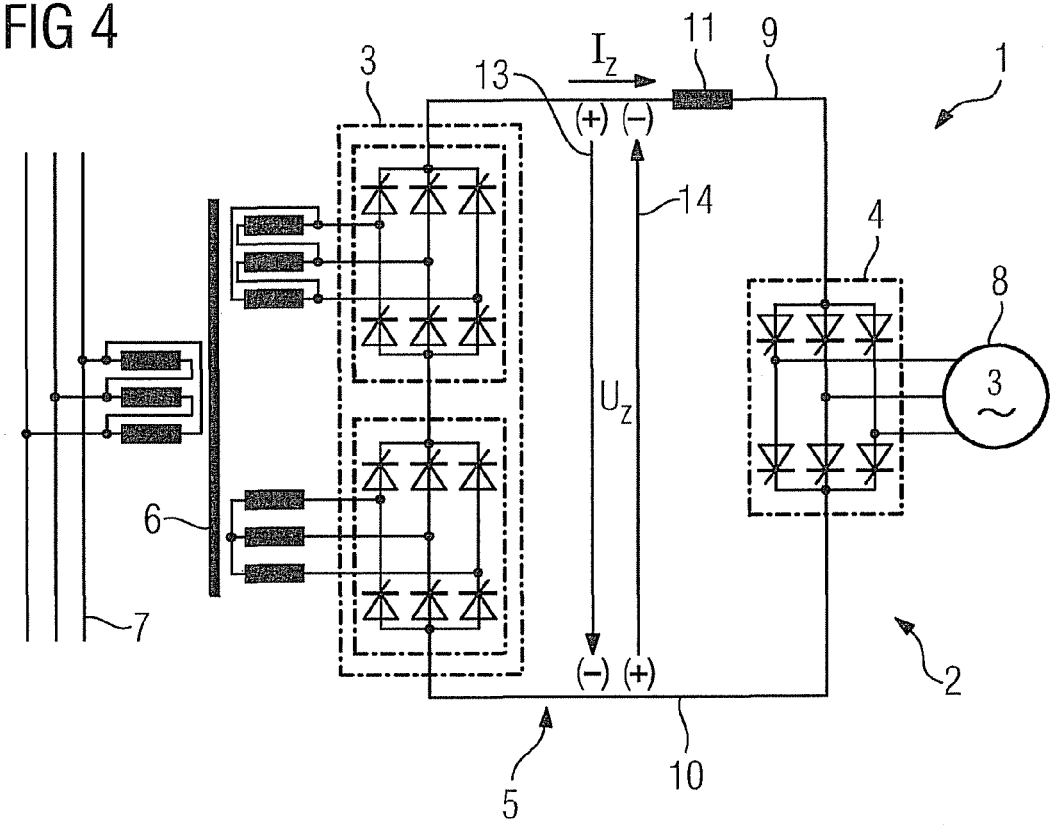
FIG. 4 shows the drive system of FIG. 2 with a representation of the intermediate circuit voltage in motor and in generator operation.

FIG. 4 shows, for the case of the drive system of FIG. 2, the different polarity of the intermediate circuit voltage $U_Z$ for motor and for generator operation of the three-phase machine 8. In this case the arrow denoted by reference number 13 indicates the polarity of the intermediate circuit voltage $U_Z$ in motor operation and the arrow pointing in the opposite direction and denoted by reference number 14 indicates the polarity of the intermediate circuit voltage $U_Z$ in generator operation.

Figure 5:
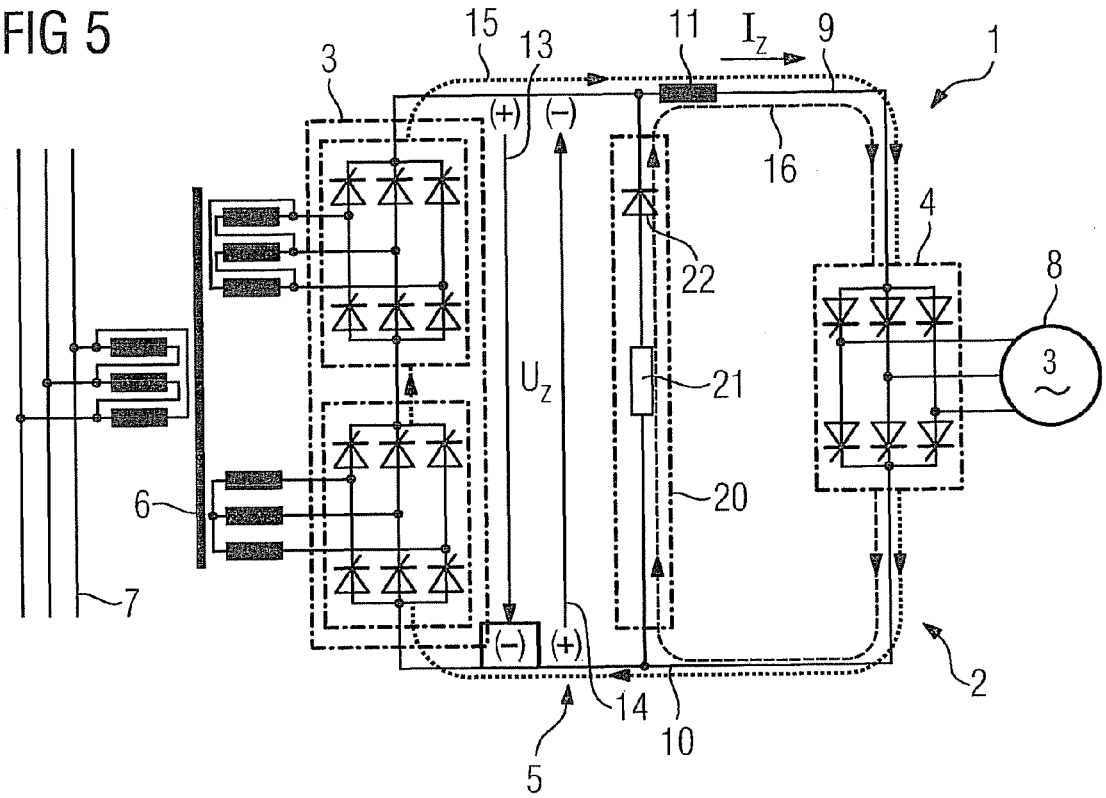
FIG. 5 shows a first embodiment of a drive system according to an embodiment of the invention.

A drive system 1 according to an embodiment of the invention shown in FIG. 5 comprises the same components as the drive system shown in FIG. 2, and additionally an energy absorbing device 20 arranged in the direct-current intermediate circuit 5. For this purpose the energy absorbing device 20 is connected between the two conductors 9, 10 of the direct-current intermediate circuit 5. The energy absorbing device 20 comprises an electrical resistor 21 as the energy absorber for absorbing the electrical energy generated by the three-phase drive machine 8 in generator operation, and outputs said energy to the intermediate circuit 5 via the motor-side current converter 4. Of course, the energy absorbing device 20 may include, instead of only a single resistor 21, a plurality of resistors, or energy stores, connected in series and/or in parallel.

In the case represented in FIG. 5, the electrical resistor 21 is designed in such a way that it can absorb all the energy generated by the three-phase drive machine 8 during a braking process of the ship in generator operation.

The energy absorbing device 20 further comprises a diode 22 which is connected in series with the resistor 21 and is polarized in such a way that it is conductive with a polarity of the intermediate circuit voltage $U_Z$ present during generator operation and indicated by the arrow 14, and blocks with a polarity of the intermediate circuit voltage $U_Z$ present during motor operation and indicated by the arrow 13. A current can flow through the resistor 21 only when the diode 22 is conductive, that is, when an intermediate circuit voltage $U_Z$ corresponding to braking operation (generator operation) is applied. In FIG. 5 that is the case when the conductor 9 has negative potential and the conductor 10 has positive potential. In this case, in FIG. 5 the direction of the intermediate circuit current $I_Z$ for motor operation, that is the drive current, is shown with a dotted line designated by 15, and the direction of the intermediate circuit current $I_Z$ for generator operation, that is, the braking current, with a dashed line designated by 16.

During braking operation the network-side current converter 3 can be brought to an inactive state by blocking the firing pulses for the valves of this current converter, so that reverse power cannot flow from the intermediate circuit 5 via the current converter 3 into the network 7.

Figure 6:
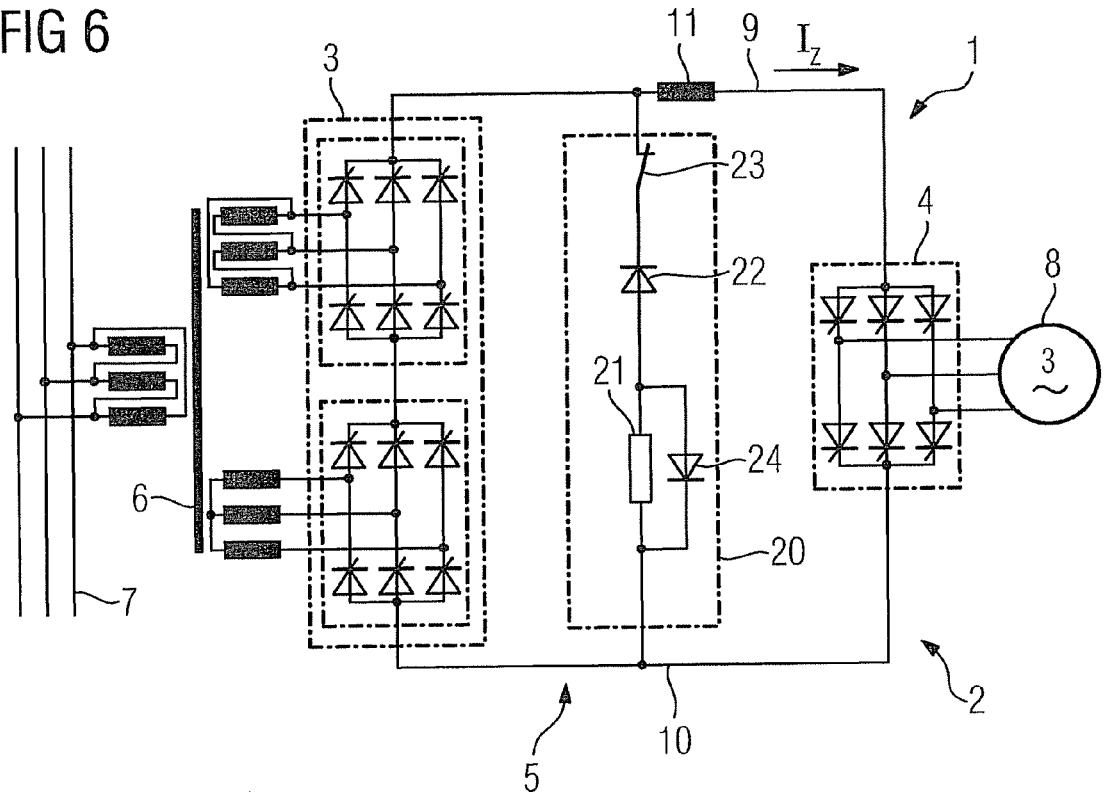
FIG. 6 shows a second embodiment of a drive system according to an embodiment of the invention.

In a drive system 1 shown in FIG. 6, the energy absorbing device 20 additionally comprises a switch 23 connected to the resistor 21 and the diode 22, so that the function "brake with braking resistor" can be switched in or out as required. In that case it is recommended also to connect a so-called free-wheeling diode 24 in parallel with the resistor 21, so that the energy stored in the parasitic inductance of the resistor 21 (and possibly of its electrical connecting lines) does not lead to impermissibly high loads on the switch 23 when a braking current is switched off.

Figure 7:
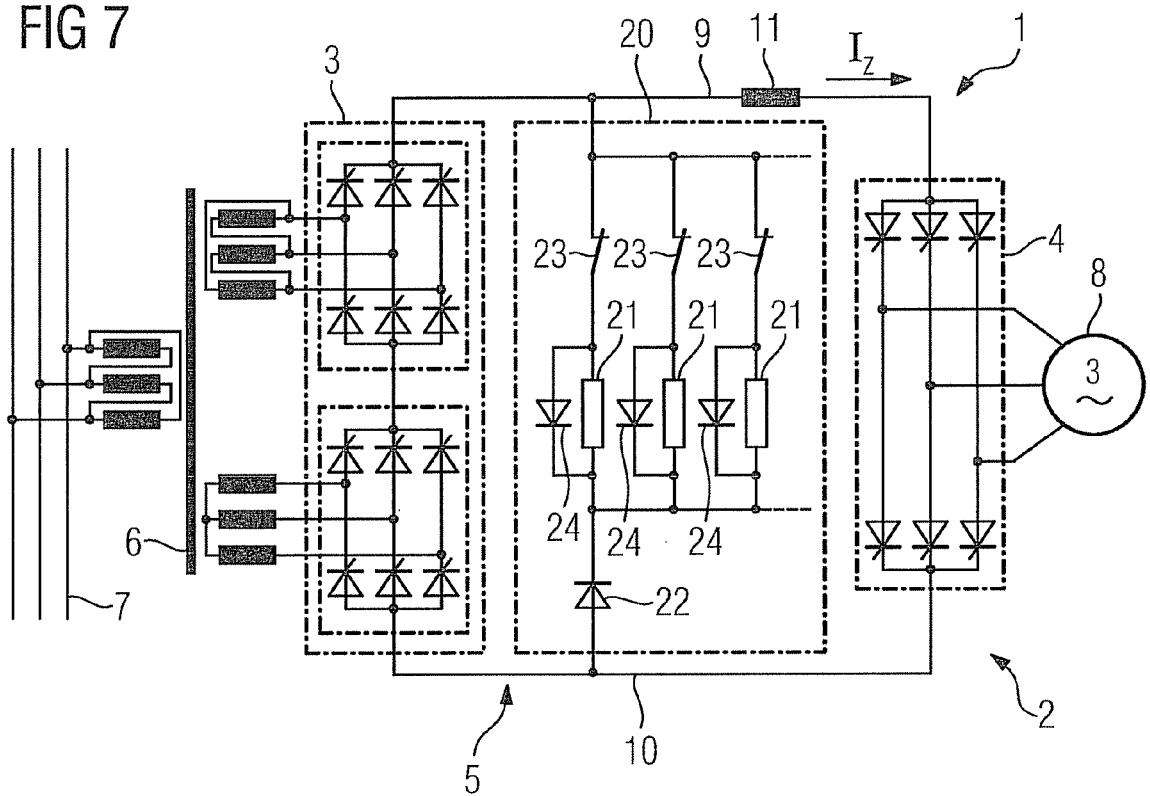
FIG. 7 shows a third embodiment of a drive system according to an embodiment of the invention.

In a drive system 1 shown in FIG. 7, the energy absorbing device 20 comprises a plurality of ohmic resistors 21 connected in parallel with one another, each having a respective switch 23 connected in series therewith. In addition, a respective free-wheeling diode 24 is connected in parallel with each of the resistors 21. In generator operation of the three-phase drive machine 8, therefore, the absorption of braking power can be varied in steps by switching the resistors 21 in or out, and can therefore be adapted to the required situation-dependent braking torque. An advantage of this solution is that the effective braking resistance in each case can be adapted to the actual motor speed. Otherwise, with an invariable braking resistance, the motor voltage induced in the motor during braking, which voltage decreases as motor speed diminishes, would bring about a likewise diminishing braking current and therefore a decreasing braking torque.

Figure 8:
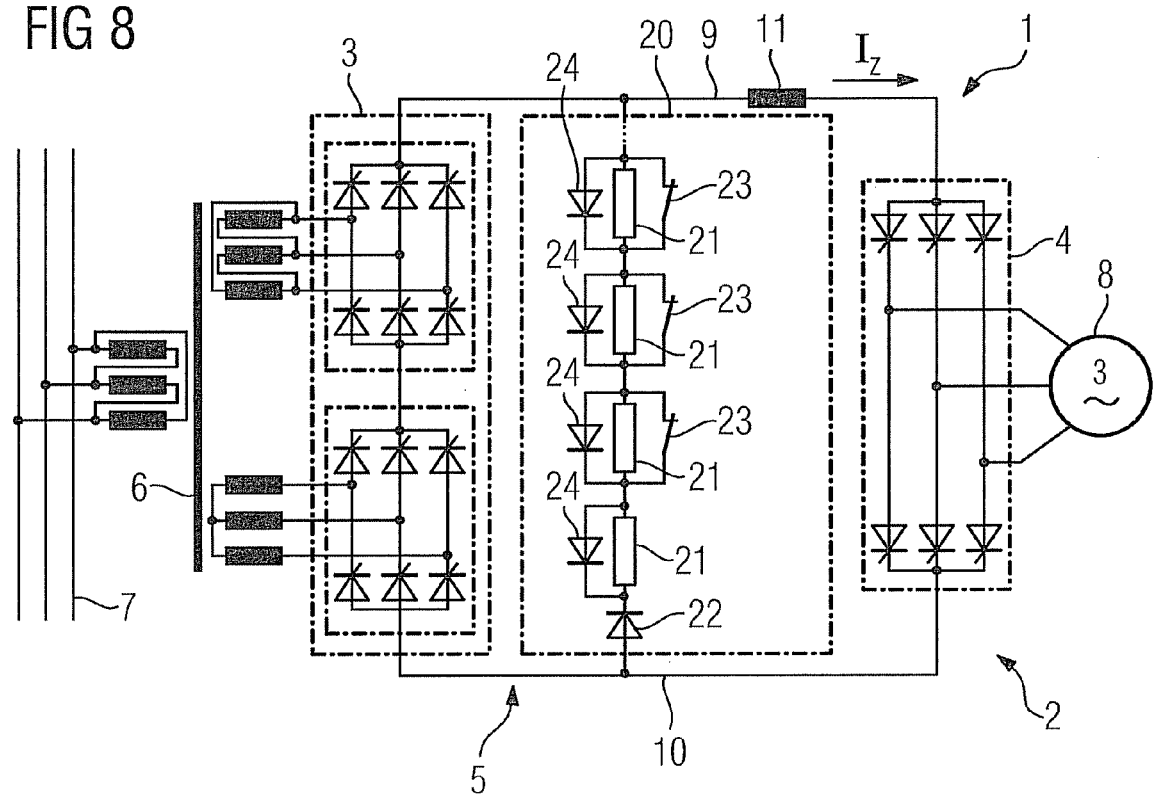
FIG. 8 shows a fourth embodiment of a drive system according to an embodiment of the invention.

As shown in FIG. 8, the energy absorbing device 20 may also comprise a plurality of resistors 21 connected in series, some or all of them having a respective switch 23 connected in parallel therewith in order to bridge the resistor 21. In addition, a respective free-running diode 24 is connected in parallel with each of the resistors 21. By opening and closing the switches 23, single or multiple resistors 21 can then be bridged, so that the absorption of braking power can also be controlled and/or regulated as a function of the required braking torque.

The ways of changing or controlling the effective braking resistance, and therefore the absorption of braking power, of the three-phase drive machine 8 represented in FIGS. 7 and 8 can be used as alternatives or in combination with one another (not shown).

Figure 9:
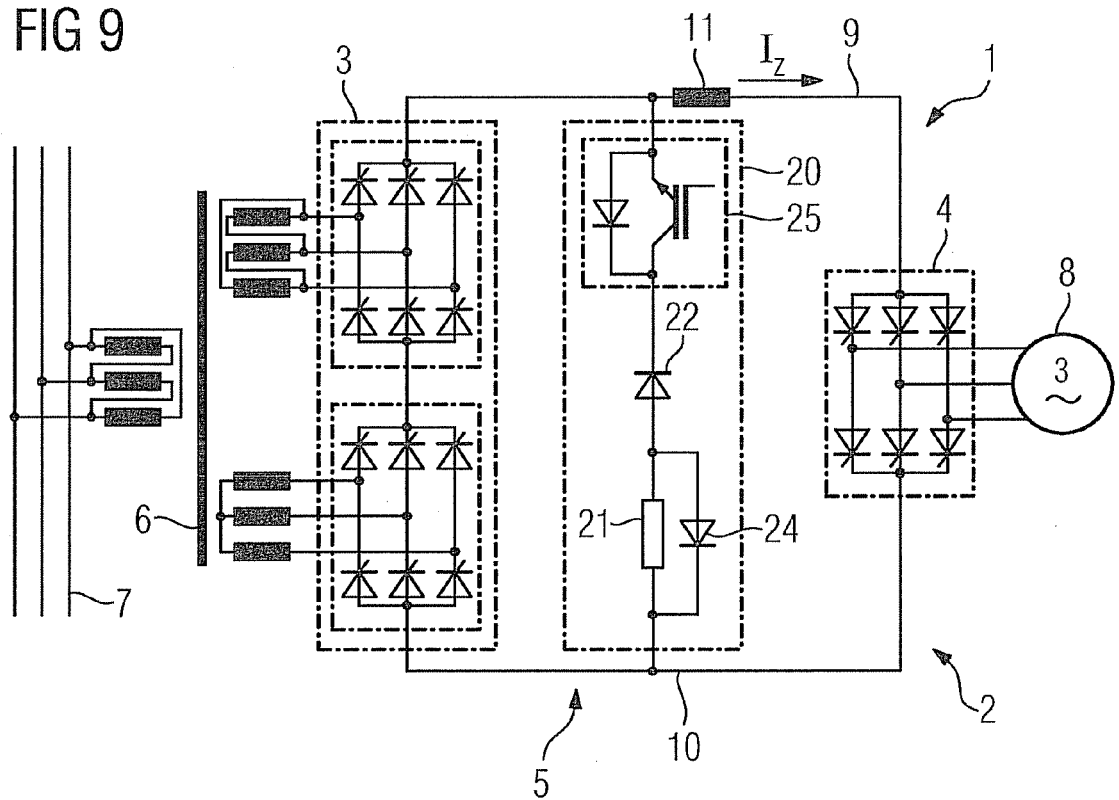
FIG. 9 shows a fifth embodiment of a drive system according to an embodiment of the invention.

The switch or switches 23 may be in the form of power electronic semiconductor switches (referred to hereinafter as "power semiconductor switches") which are able or unable to be switched off. For this purpose, for the case of the example embodiment of FIG. 6, FIG. 9 shows an embodiment of the switch 23 advantageously as a controllable, power semiconductor switch 25 which can be switched off, in the form of an IGBT.

If a reverse-blocking power semiconductor switch is used for the power semiconductor switch, a diode for activating energy absorption connected in series with the resistor may also be omitted. For this purpose, for the case of the example embodiment of FIG. 6, FIG. 10 shows that a controllable, reverse-blocking power semiconductor switch connected in series with the resistor 21, which is represented in FIG. 10 in the form of a thyristor 26, is used instead of the diode 22.

A reverse-blocking power semiconductor switch is very well suited to this application because it can absorb both a cut-off voltage and a blocking voltage; that is, such a power semiconductor switch 26 can also take over the function of the diode 22, as represented, for example, in FIG. 6 and FIG. 7.

Figure 10:
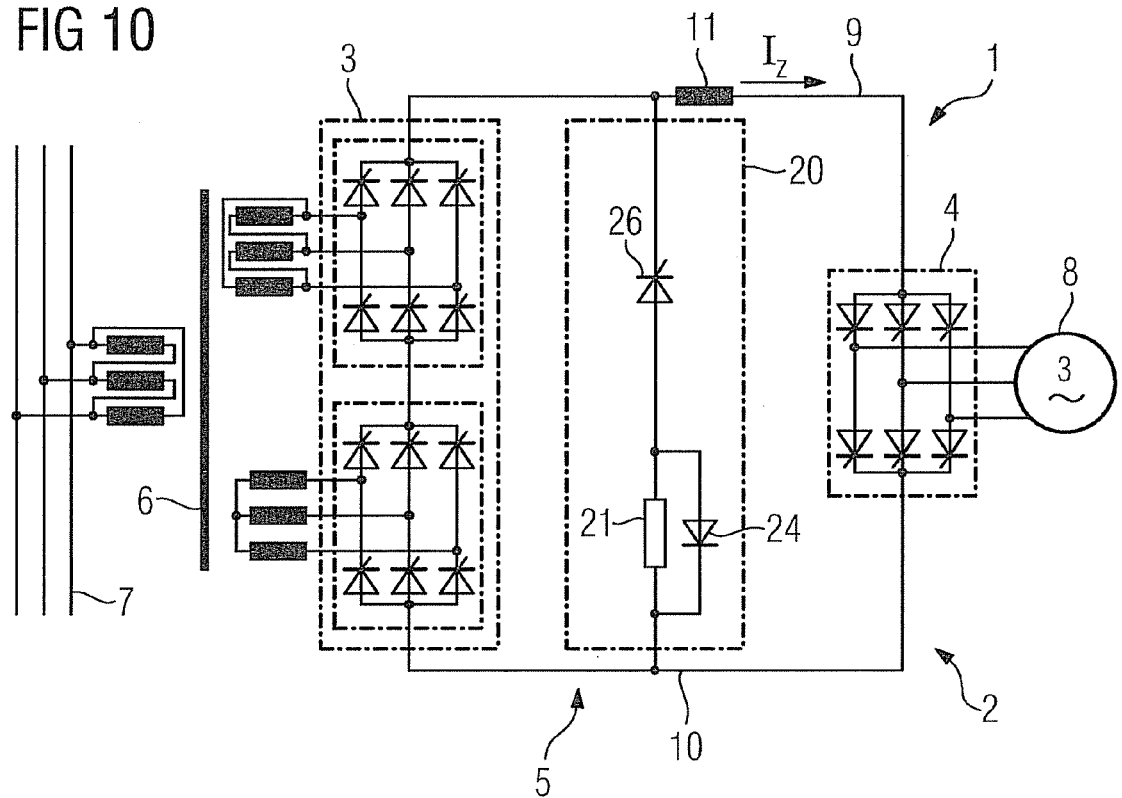
FIG. 10 shows a sixth embodiment of a drive system according to an embodiment of the invention.

The reverse-blocking power semiconductor switch, the thyristor 26 in FIG. 10, is polarized in such a way that, with a polarity of the intermediate circuit voltage present in generator operation, it can be switched to a conductive state and, with a polarity of the intermediate circuit voltage $U_Z$ present in motor operation, it blocks.

Because thyristors are not power electronic components which can be switched off, after one activation ("firing") of the thyristor 26 a braking current flows through the respective resistor 21 until the zero passage of the current has been reached. That is the case when the braking energy arising in the resistor 21 has been practically completely eliminated or the converter 2 has been returned to motor operation, so that the thyristor 26 again blocks with the intermediate circuit voltage $U_Z$ arising in this case.

Controllable power semiconductor switches which can be switched off (e.g. IGBTs, IGCTs) and controllable power semiconductor switches which cannot be switched off (e.g. thyristors) may be used as alternatives or in combination with one another (not shown) for the switches 23.

Figure 11:
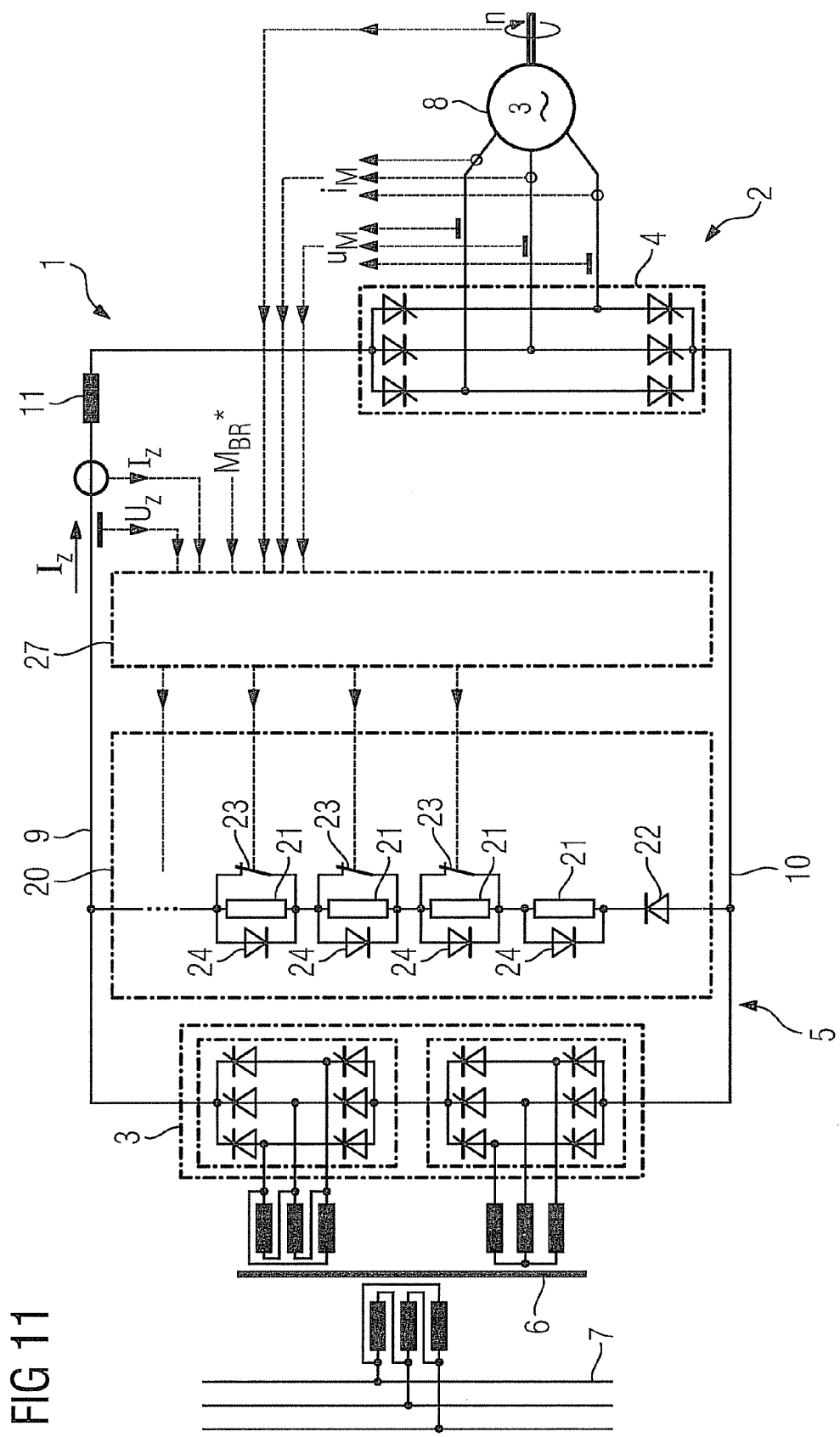
FIG. 11 shows a seventh embodiment of a drive system according to an embodiment of the invention.

As illustrated in FIG. 11, it is further especially advantageous if the drive system includes a monitoring and control device 27, which is set up in such a way that it controls and/or regulates the absorption of electrical braking power of the three-phase drive machine 8 by the energy absorbing device 20 as a function of a desired reference braking torque $M_{Br}{}^*$ of the three-phase drive machine 8 and as a function of actual values of the drive system 1. For this purpose the monitoring and control device 27 detects and evaluates the polarity of the intermediate circuit voltage $U_Z$ and/or the level of the intermediate circuit voltage $U_Z$ and/or the intermediate circuit current $I_Z$ and/or the motor speed n and/or the motor voltage $U_M$ and generates therefrom activation signals for the switches 23, so that a change or adaptation of the braking power effective at a given time can be carried out as required or as a function of the working point of the drive system 1, for example by switching braking resistors 21 in and/or out (as explained in connection with FIG. 7 and FIG. 8).

It is especially advantageous if power semiconductor switches which can or which cannot be switched off are used for the switches 23, as already represented in an example manner in FIGS. 9 and 10.

In addition to the stepwise variation of the absorption of braking power which has been described, the energy absorbing device 20 may also be configured to be stepless, in that steplessly variable energy absorbers, for example steplessly variable ohmic resistors, are used as energy absorbers.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A drive system for a facility having an alternating-current isolated network, comprising
a three-phase drive machine, operatable both as a motor and as a generator;
a converter including a direct-current intermediate circuit including an intermediate circuit voltage, the converter including a network-side current converter and a machine-side current converter, the network-side current converter being connectable on an input side to the alternating-current isolated network and being connected on an output side to the direct-current intermediate circuit, and a motor-side current converter being connected on an input side to the direct-current intermediate circuit and on an output side to the three-phase drive machine, the three-phase drive machine being capable drawing electrical energy from the alternating-current isolated network in motor operation via the converter and being capable of generating electrical energy in generator operation and outputting said electrical energy to the intermediate circuit via the motor-side current converter; and
an energy absorbing device arranged in the intermediate circuit and comprising at least one energy absorber which includes at least one ohmic resistor, to absorb at least a part of the electrical energy which the three-phase drive machine generates in generator operation and outputs via the motor-side current converter to the intermediate circuit, the at least one energy absorber being activatable by the energy absorbing device at least as a function of the polarity of the intermediate circuit voltage, wherein, in order to activate the at least one energy absorber, the energy absorbing device includes a diode which is connected in series with the energy absorber and is polarized in such a way that it is conductive with a polarity of the intermediate circuit voltage present during generator operation and blocks with a polarity of the intermediate circuit voltage present during motor operation.

2. A drive system for a facility having an alternating-current isolated network, comprising
a three-phase drive machine, operatable both as a motor and as a generator;
a converter including a direct-current intermediate circuit including an intermediate circuit voltage, the converter including a network-side current converter and a machine-side current converter, the network-side current converter being connectable on an input side to the alternating-current isolated network and being connected on an output side to the direct-current intermediate circuit, and a motor-side current converter being connected on an input side to the direct-current intermediate circuit and on an output side to the three-phase drive machine, the three-phase drive machine being capable drawing electrical energy from the alternating-current isolated network in motor operation via the converter and being capable of generating electrical energy in generator operation and outputting said electrical energy to the intermediate circuit via the motor-side current converter; and
an energy absorbing device arranged in the intermediate circuit and comprising at least one energy absorber which includes at least one ohmic resistor, to absorb at least a part of the electrical energy which the three-phase drive machine generates in generator operation and outputs via the motor-side current converter to the intermediate circuit, the at least one energy absorber being activatable by the energy absorbing device at least as a function of the polarity of the intermediate circuit voltage, wherein, in order to activate the at least one energy absorber, the energy absorbing device includes a controllable power electronic semiconductor switch which is connected in series with the energy absorber and is polarized in such a way that it is switchable to a conductive state with a polarity of the intermediate circuit voltage present during generator operation and blocks with a polarity of the intermediate circuit voltage present during motor operation.

3. The drive system as claimed in claim 1, wherein the energy absorbing device is configured to be variable with regard to an absorption of electrical braking power of the three-phase drive machine.

4. The drive system as claimed in claim 3, wherein, in order to vary the absorption of electrical braking power of the three-phase drive machine, the energy absorbing device includes for at least some of the energy absorbers a respective switch connected in series or in parallel with the respective energy absorber.

5. The drive system as claimed in claim 4, wherein the switch or switches are in the form of power electronic semiconductor switches.

6. The drive system as claimed in claim 2, wherein the power electronic semiconductor switch is in the form of a reverse-blocking power electronic component.

7. The drive system as claimed in claim 3, wherein, in order to vary the absorption of electrical braking power of the three-phase drive machine, at least one of the energy absorbers is in the form of a continuously variable ohmic resistor.

8. The drive system as claimed in claim 3, further comprising:
a monitoring and control device to at least one of control and regulate the absorption of braking power of the three-phase drive machine by the energy absorbing device as a function of a desired reference braking torque of the three-phase drive machine and as a function of actual values of the drive system.

9. The drive system as claimed in claim 1, wherein the three-phase drive machine includes a power in the single-digit or multi-digit megawatt range.

10. The drive system as claimed in claim 1, wherein the at least one energy absorber is in the form of an energy store.

11. The drive system of claim 1, wherein the drive system is for a ship or an offshore platform.

12. The drive system as claimed in claim 6, wherein the power electronic semiconductor switch is in the form of a thyristor.

13. The drive system as claimed in claim 5, wherein the power electronic semiconductor switch is in the form of a reverse-blocking power electronic component.

14. The drive system as claimed in claim 13, wherein the power electronic semiconductor switch is in the form of a thyristor.

15. The drive system as claimed in claim 2, wherein the energy absorbing device is configured to be variable with regard to an absorption of electrical braking power of the three-phase drive machine.

16. The drive system as claimed in claim 15, wherein, in order to vary the absorption of electrical braking power of the three-phase drive machine, the energy absorbing device includes for at least some of the energy absorbers a respective switch connected in series or in parallel with the respective energy absorber.

17. The drive system as claimed in claim 16, wherein the switch or switches are in the form of power electronic semiconductor switches.

18. The drive system as claimed in claim 15, wherein, in order to vary the absorption of electrical braking power of the three-phase drive machine, at least one of the energy absorbers is in the form of a continuously variable ohmic resistor.

19. The drive system as claimed in claim 15, further comprising:
a monitoring and control device to at least one of control and regulate the absorption of braking power of the three-phase drive machine by the energy absorbing device as a function of a desired reference braking torque of the three-phase drive machine and as a function of actual values of the drive system.

20. The drive system as claimed in claim 2, wherein the three-phase drive machine includes a power in the single-digit or multi-digit megawatt range.

21. The drive system as claimed in claim 2, wherein the at least one energy absorber is in the form of an energy store.

22. The drive system of claim 2, wherein the drive system is for a ship or an offshore platform.

23. The drive system as claimed in claim 2, wherein the power electronic semiconductor switch is in the form of a reverse-blocking power electronic component.

* * * * *